United States Patent
Hajduch

(10) Patent No.: US 8,991,774 B2
(45) Date of Patent: Mar. 31, 2015

(54) CABLE TIE MOUNT

(71) Applicant: Panduit Corp., Tinley Park, IL (US)

(72) Inventor: Michael P. Hajduch, Munster, IN (US)

(73) Assignee: Panduit Corp., Tinley Park, IL (US)

( * ) Notice: Subject to any disclaimer, the term of this patent is extended or adjusted under 35 U.S.C. 154(b) by 83 days.

(21) Appl. No.: 13/719,539

(22) Filed: Dec. 19, 2012

(65) Prior Publication Data

US 2013/0160246 A1 Jun. 27, 2013

Related U.S. Application Data

(60) Provisional application No. 61/579,308, filed on Dec. 22, 2011.

(51) Int. Cl.
  *F16L 3/00* (2006.01)
  *B65D 63/00* (2006.01)
  *F16B 5/06* (2006.01)
  *H02G 3/32* (2006.01)

(52) U.S. Cl.
  CPC .............. *B65D 63/00* (2013.01); *F16B 5/0685* (2013.01); *H02G 3/32* (2013.01); *Y10S 269/903* (2013.01)
  USPC ...... 248/73; 248/68.1; 248/74.3; 248/220.22; 269/903

(58) Field of Classification Search
  USPC .............. 248/65, 73, 49, 62, 68.1, 74.1, 74.3, 248/220.21, 220.22; 269/903
  See application file for complete search history.

(56) References Cited

U.S. PATENT DOCUMENTS

| | | | |
|---|---|---|---|
| 3,460,788 A | | 8/1969 | Goldman |
| 4,518,138 A | * | 5/1985 | Stutenkemper et al. ......... 248/73 |
| 5,221,065 A | * | 6/1993 | Siems et al. ..................... 248/65 |
| 5,390,876 A | * | 2/1995 | Hatano et al. ................... 248/73 |
| 5,505,411 A | | 4/1996 | Heaton et al. |
| 5,586,739 A | * | 12/1996 | Gantner et al. .............. 248/74.1 |
| 5,664,754 A | | 9/1997 | Gaenslen |
| 5,730,399 A | * | 3/1998 | Baginski ......................... 248/58 |
| 5,799,906 A | * | 9/1998 | Hillegonds ....................... 248/49 |
| D399,414 S | | 10/1998 | Viklund |
| 5,820,083 A | | 10/1998 | Geiger |
| 6,042,062 A | * | 3/2000 | Sugiyama ........................ 248/65 |
| 6,533,226 B2 | | 3/2003 | Geiger |
| 6,592,083 B1 | | 7/2003 | Hobson et al. |
| 6,672,029 B2 | * | 1/2004 | Tucker ....................... 52/745.21 |
| 7,113,392 B2 | | 9/2006 | Lu et al. |
| 7,437,804 B1 | | 10/2008 | Geiger et al. |
| 7,600,724 B2 | * | 10/2009 | Nelson et al. ................ 248/68.1 |
| 7,861,981 B2 | | 1/2011 | Olver |

(Continued)

FOREIGN PATENT DOCUMENTS

| EP | 1620670 B1 | 12/2008 |
|---|---|---|
| EP | 2070772 A1 | 6/2009 |

(Continued)

*Primary Examiner* — Bradley Duckworth
(74) *Attorney, Agent, or Firm* — Christopher S. Clancy; Aimee E. McVady

(57) ABSTRACT

The present invention is directed towards a cable tie mount. The cable tie mount includes a body and a mount. The mount includes a top, a bottom, sides, and a channel therethrough. The body has a base member with a mounting hole and a receiving member with a locking hole. The receiving member extends at an angle from the base member. The mount is installed on the receiving member of the body such that the receiving member is positioned within the channel of the mount.

17 Claims, 27 Drawing Sheets

(56) References Cited

U.S. PATENT DOCUMENTS

| | | | |
|---|---|---|---|
| 8,141,831 B2 * | 3/2012 | Julian et al. | 248/220.21 |
| 8,313,064 B2 * | 11/2012 | Stocker | 248/71 |
| 8,413,934 B2 * | 4/2013 | Hara | 248/68.1 |
| 8,602,798 B2 * | 12/2013 | Downing | 439/100 |
| 2003/0222184 A1 | 12/2003 | Geiger | |
| 2004/0076465 A1 | 4/2004 | Geiger | |
| 2007/0257159 A1 * | 11/2007 | Nelson et al. | 248/73 |
| 2007/0272807 A1 | 11/2007 | Takagaki | |
| 2008/0105796 A1 * | 5/2008 | Nix et al. | 248/73 |
| 2008/0223995 A1 * | 9/2008 | Corbin | 248/74.3 |
| 2008/0296443 A1 * | 12/2008 | Lunitz et al. | 248/65 |
| 2008/0296444 A1 | 12/2008 | Geiger | |
| 2010/0096511 A1 * | 4/2010 | Olver | 248/65 |
| 2010/0186197 A1 | 7/2010 | Inomata et al. | |
| 2012/0037764 A1 * | 2/2012 | Stephan et al. | 248/65 |
| 2013/0037661 A1 * | 2/2013 | Grubbs | 248/62 |

FOREIGN PATENT DOCUMENTS

| | | |
|---|---|---|
| FR | 2190188 A5 | 1/1974 |
| WO | 2004097280 A1 | 11/2004 |
| WO | 2007051639 A1 | 5/2007 |
| WO | 2008093705 A1 | 8/2008 |
| WO | 2008155082 A | 12/2008 |
| WO | 2009084302 A1 | 7/2009 |

* cited by examiner

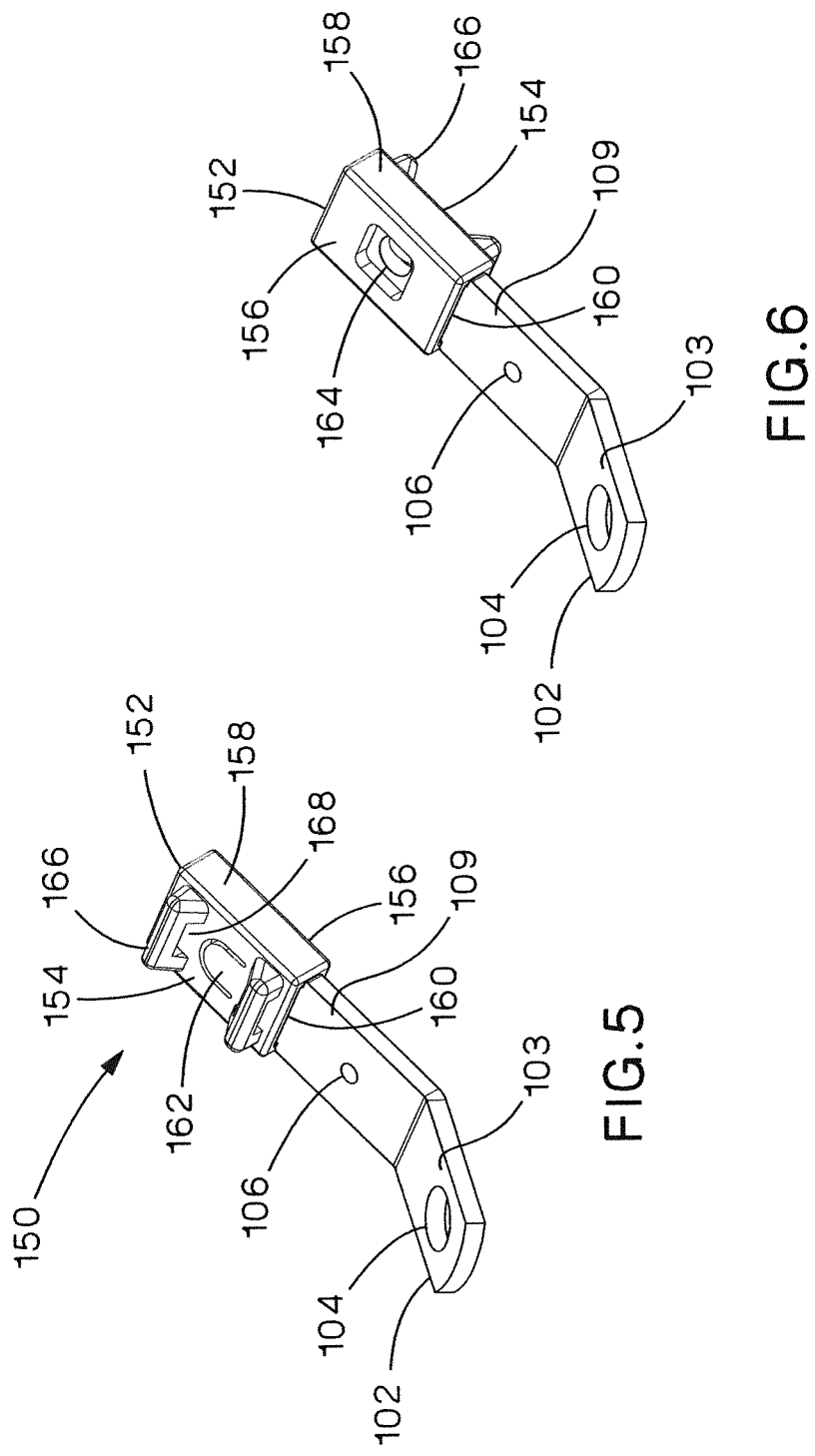

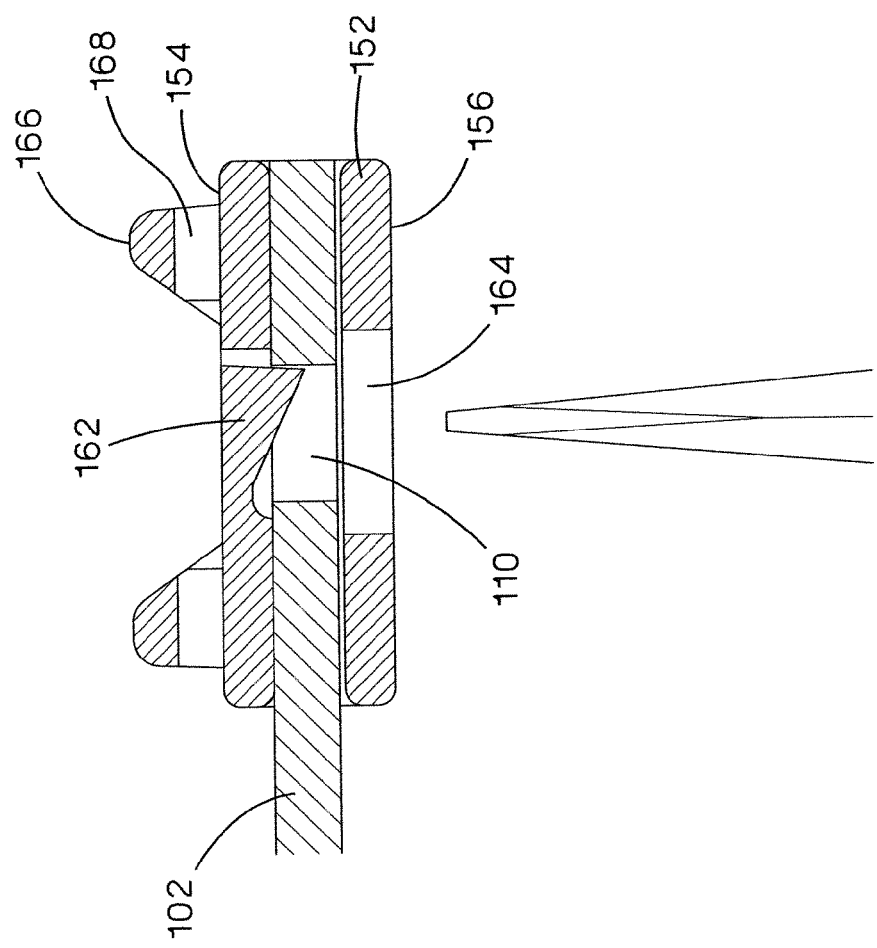

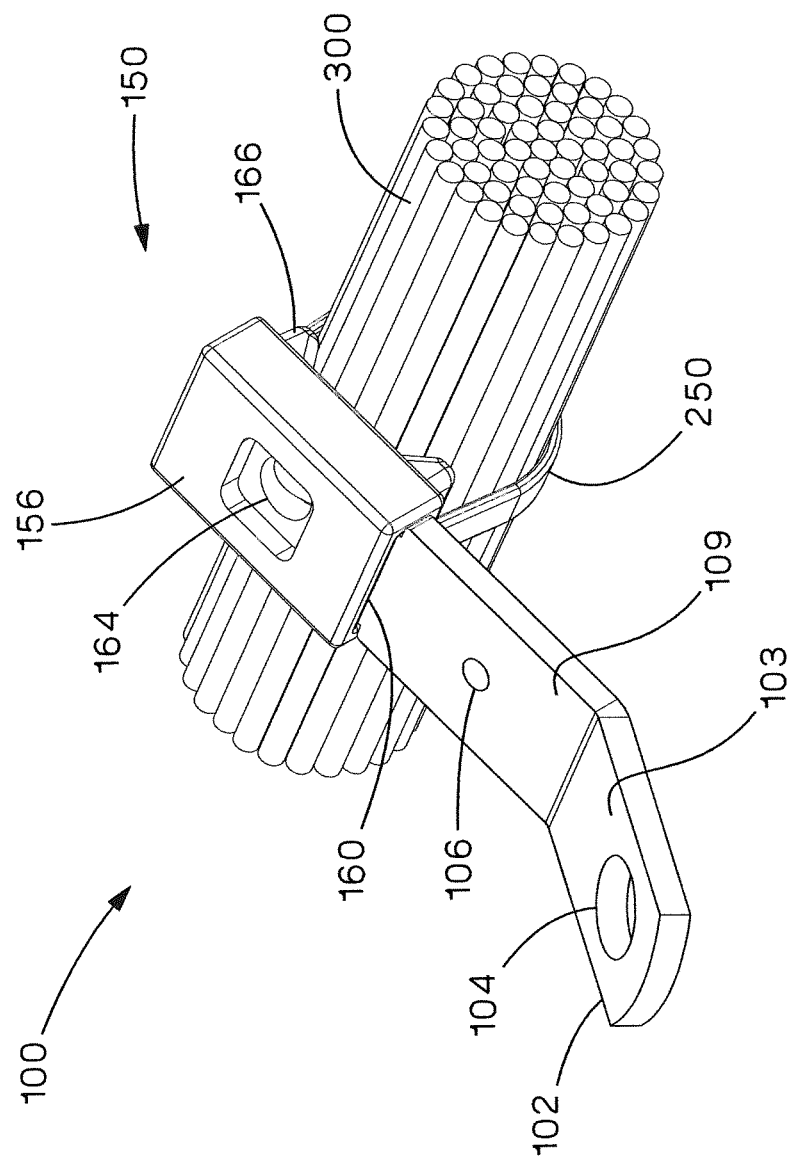

CABLE TIE MOUNT

CROSS REFERENCE TO RELATED APPLICATION

This application claims priority to U.S. Provisional Application No. 61/579,308, filed Dec. 22, 2011, the subject matter of which is hereby incorporated by reference in its entirety.

FIELD OF THE INVENTION

The present invention relates to a cable tie mount, and more particularly, to a cable tie mount for heavy equipment manufacturers.

BACKGROUND OF THE INVENTION

Heavy equipment manufacturers utilize several types of mounts to route cables, hoses, and tubing. Each mount includes a steel body that allows a high fastener torque and a vinyl, rubber, or plastic fastening surface to provide abrasion protection for the cable, hose, or tube being routed. Manufacturers have used vinyl coated or lined P clamps 50 (see FIG. 1), vinyl coated ladder brackets 60 (see FIG. 2), and nylon mounts insert molded with steel bushings 70 (see FIG. 3).

The prior art mounts are fastened either to a threaded stud with a nut or to a threaded hole with a bolt. Some mounts sit in recessed areas on engine castings or vehicle frames. Some mounts have other components mounted in close proximity to them. The existing fastener lengths and recess depths are set and cannot be adjusted. The thickness of the mount is limited due to the set fastener lengths, and the width of the mount is limited due to the recessed area widths and other surrounding components.

The prior art mounts illustrated in FIGS. 1-3 have various disadvantages. As illustrated in FIG. 1, the vinyl coated or lined P clamp 50 is a fixed length and fixed diameter mount thus the clamp has no adjustability with the grip diameter, standoff distance or angle. The vinyl coating on the clamp wears and can expose the metal clamp or causes the grip to loosen on the secured item thereby potentially damaging the secured item. The vinyl coated P clamp 50 cannot be pre-assembled to a wiring harness because it does not get clamped until assembled to the engine or vehicle.

The vinyl coated ladder bracket 60 illustrated in FIG. 2 may be manufactured with multiple lengths and angles and may use a cable tie to secure the items. The ladder bracket design provides for some adjustability with the standoff distance. However, manufacturers generally limit the ladder bracket to one or two lengths and try to specify which rung to attach to in an attempt to standardize components. Installers frequently secure items to the wrong rung during assembly causing the harness routing length to not fit properly. Also, attaching an item to the last rung is typically not allowed, but it does happen. Fastening an item to the last rung does not provide sufficient support. The secured item often rolls over the end of the mount causing damage to the secured item. Finally, the vinyl coating on the ladder bracket wears and can expose the metal ladder bracket or causes the grip to loosen on the secured item thereby potentially damaging the secured item.

As illustrated in FIG. 3, the insert molded nylon mounts 70 have a fixed length. As a result, the insert molded nylon mounts 70 provide no adjustability with the standoff distance or angle. The insert molded nylon mounts 70 require a large clearance to install and a long fastener to secure the mount. As a result, the insert molded nylon mount 70 is prohibited as a replacement to other mounts since it typically can't be used with the existing stud or bolt lengths and the insert molded nylon mount doesn't fit into existing recessed areas. Also, the insert molded nylon mount 70 is expensive to manufacture and it requires special molding equipment.

SUMMARY OF THE INVENTION

A cable tie mount for heavy equipment manufacturer applications is disclosed. The cable tie mount includes a body and at least one mount. The body has a base member and a receiving member that extends at an angle from the base member. The mount includes a top, a bottom, sides, and a channel therethrough. The mount is secured to the body with the receiving member positioned within the channel of the mount.

BRIEF DESCRIPTION OF THE DRAWINGS

FIG. 5 is a perspective view of the snap-on mount installed on the steel body of FIG. 4.

FIG. 6 is a perspective view of the snap-on mount of FIG. 4 installed on the steel body in a reversed orientation with the snap-on mount facing downward.

FIG. 7 is a cross sectional view of the snap-on mount installed on the steel body of FIG. 5.

FIG. 9 is a perspective view of the snap-on mount installed on the steel body of FIG. 6 with a bundle and a cable tie installed in the snap-on mount to secure the bundle.

DETAILED DESCRIPTION

Figure 2:
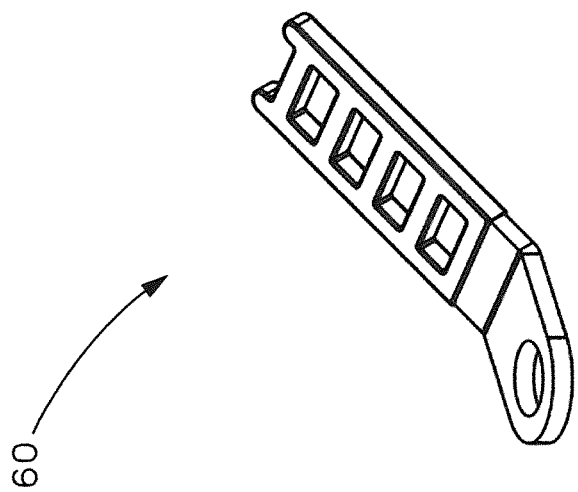
FIG. 2 is a perspective view of a prior art vinyl coated ladder bracket.
Figure 1:
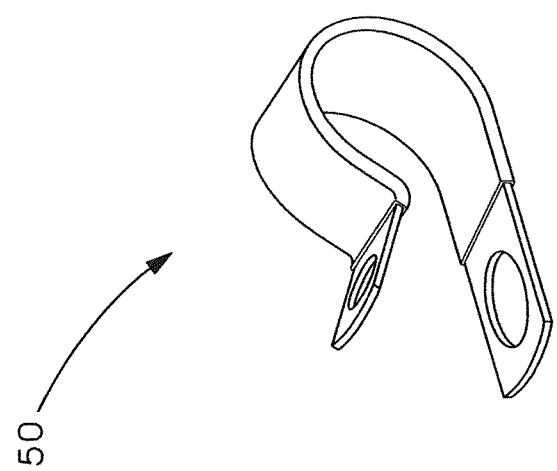
FIG. 1 is a perspective view of a prior art vinyl coated or lined P clamp.
Figure 3:
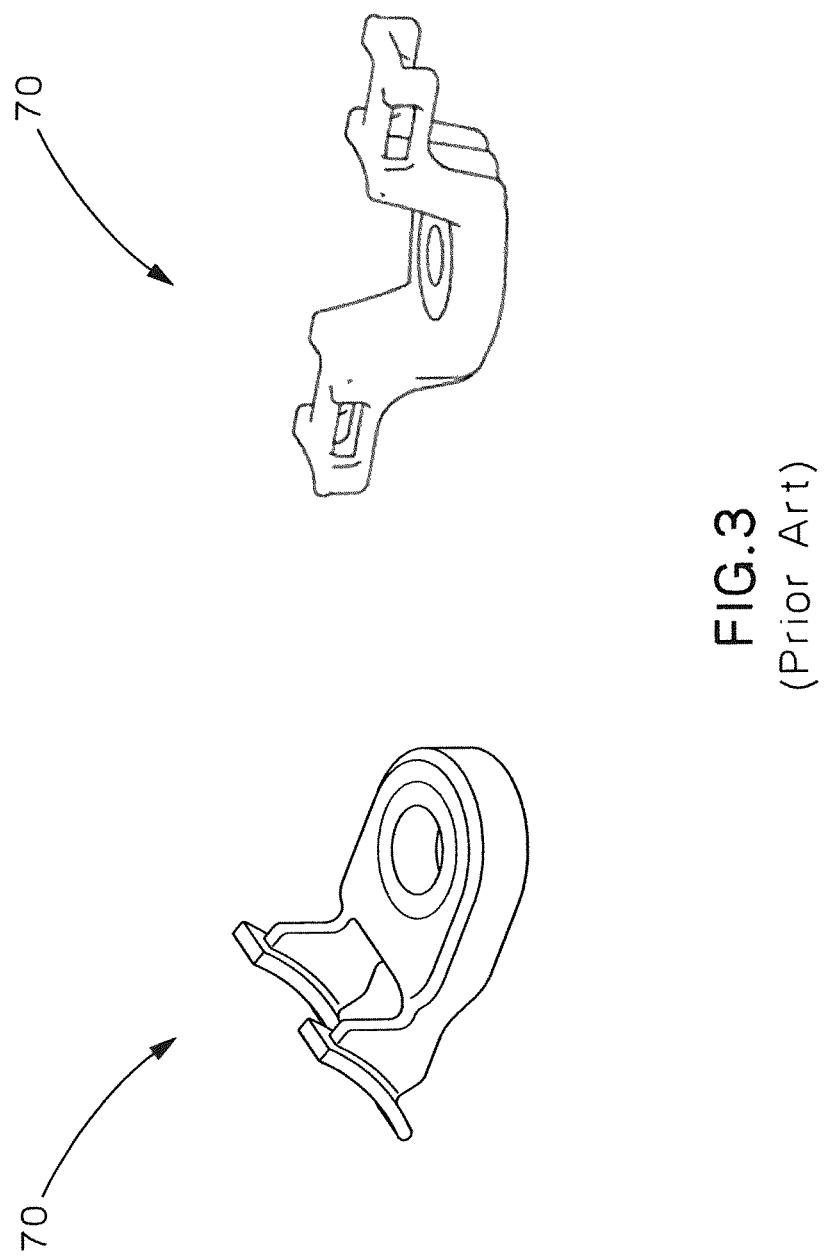
FIG. 3 is a perspective view of prior art insert molded nylon mounts.
Figure 4:
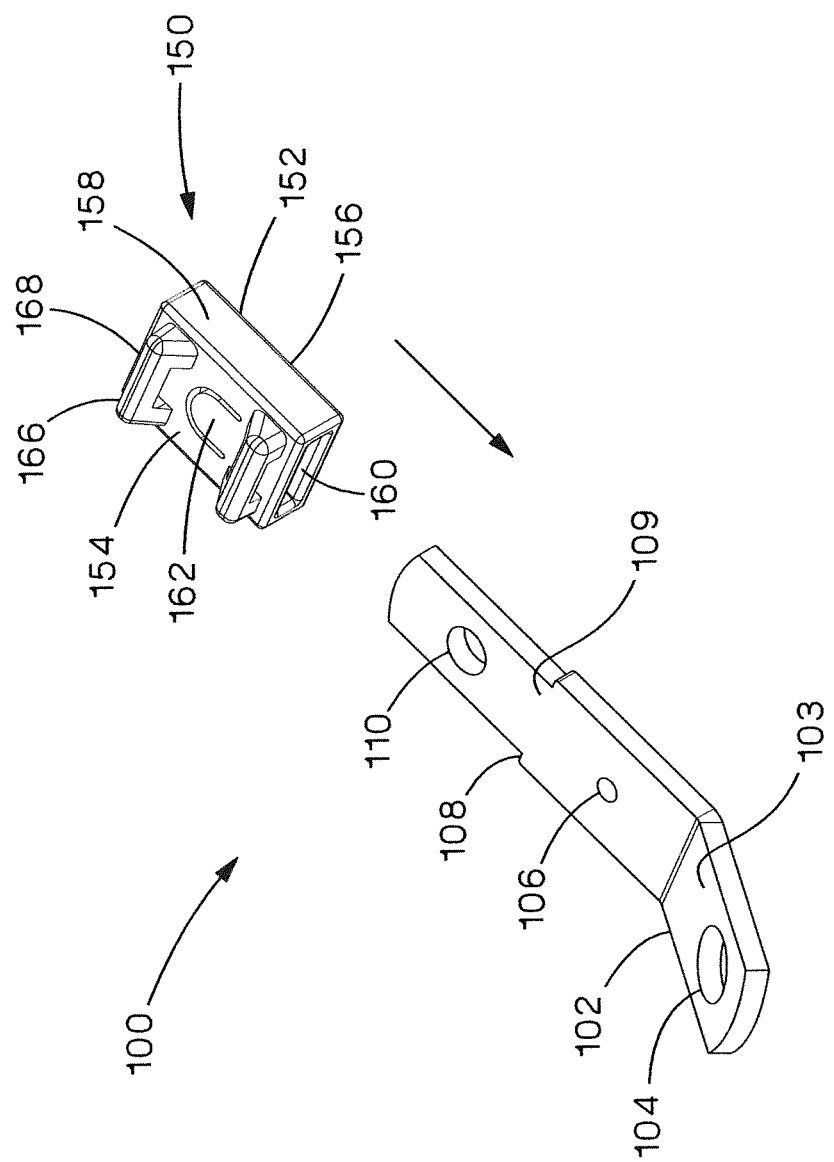
FIG. 4 is an exploded perspective view of the cable tie mount of the present invention with a steel body and a snap-on mount positioned to be installed on the steel body.

The present invention discloses heavy duty mounts for heavy equipment manufacturer applications. FIGS. 4-11 illustrate a two piece mount 100 that can be preassembled or field assembled without the use of tools. The two piece mount 100 includes a steel body 102 and a molded snap-on mount 150.

The steel body 102 is an angled body with a plurality of holes. The steel body 102 includes a base member 103 with a mounting hole 104 and a receiving member 109 with a locking hole 110. The locking hole 110 prevents the snap-on mount 150 from being pulled off of the body 102. The steel body 102 may include a grounding hole 106 for attaching a grounding cable from a wiring harness with a self-tapping screw. The steel body 102 also includes mount stops 108 to limit the insertion distance of the snap-on mount 150.

The steel body 102 allows high fastener torques which are required by heavy equipment manufacturers. The steel body 102 may be made with different lengths, with various angled bend points and to receive various bolt sizes while using the same nylon snap-on mount 150. The body 102 thickness and width will accommodate existing fastener lengths and recessed area spacing, allowing the steel body 102 to be used as a substitute for other types of mounts.

The snap-on mount 150 includes a base 152 with a top 154, a bottom 156, sides 158, and a channel 160 therethrough. The top 154 of the base 152 includes a locking pawl 162 and the bottom 156 of the base 152 includes a hole 164. Alternatively, the top of the base may include a hole and the bottom of the base may include a locking pawl. Projections 166 extending from the top 154 of the base 152 define a passageway 168 for receiving a cable tie 250. The projections 166 create a low profile cradle design that keeps the bundle 300 close to the mounting surface where overhead space is limited and provides maximum stability for secured items.

The snap-on mount 150 is pushed onto the steel body 102 until it locks in place. The pawl 162 at the center of the snap-on mount 150 engages the locking hole 110 in the steel body 102, thereby preventing the snap-on mount 150 from being pulled off. As illustrated in FIG. 7, the pawl 162 can be released via a screw driver when the snap-on mount 150 needs to be removed or the orientation of the snap-on mount 150 needs to be reversed (see FIG. 6).

The snap-on mounts 150 are made from a material that withstands high temperatures such as heat stabilized Nylon 6.6 or PEEK. The snap-on mount 150 provides permanent abrasion protection and smooth contoured edges. Thus, the snap-on mount 150 will not wear like the prior art vinyl coating mounts.

Figure 8:
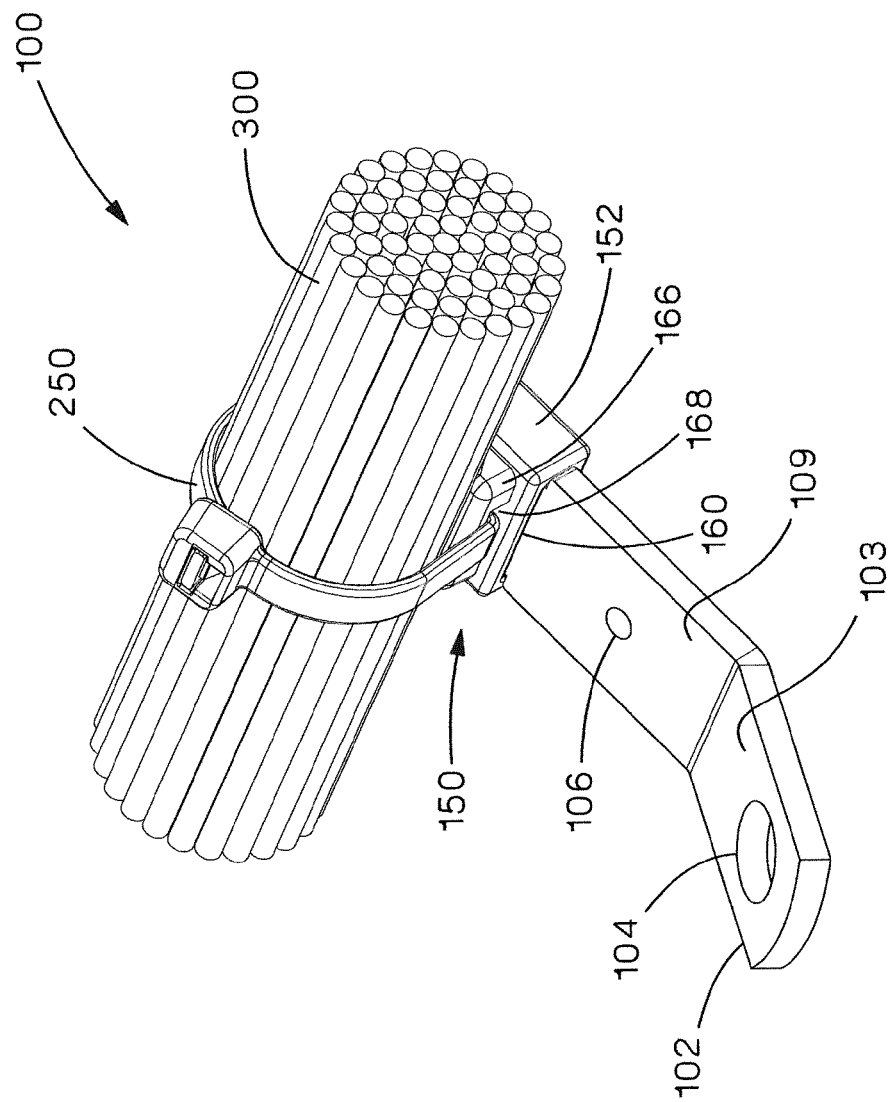
FIG. 8 is a perspective view of the of the snap-on mount installed on the steel body of FIG. 5 with a bundle and a cable tie installed in the snap-on mount to secure the bundle.

The mount assembly can be pre-assembled to the wiring harness as the harness is being fabricated. As illustrated in FIGS. 8 and 9, a cable tie 250 securely attaches the bundle 300 to the snap-on mount 150 and won't loosen over time.

Figure 11:
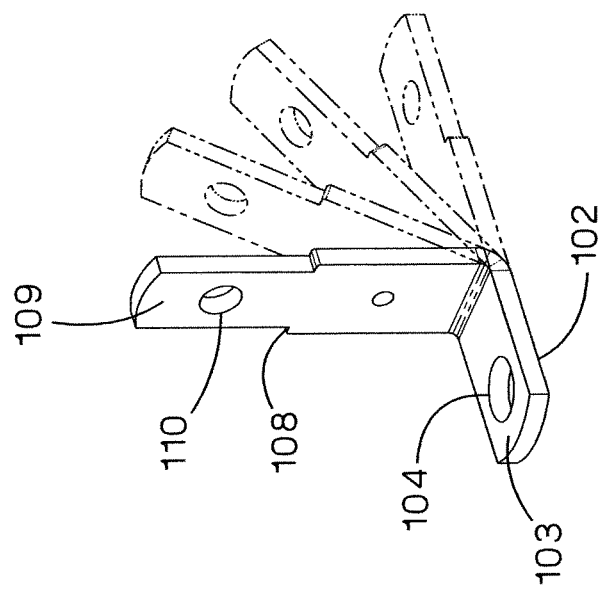
FIG. 11 is a perspective view of the steel body of FIG. 4 illustrating various bend angles.
Figure 10:
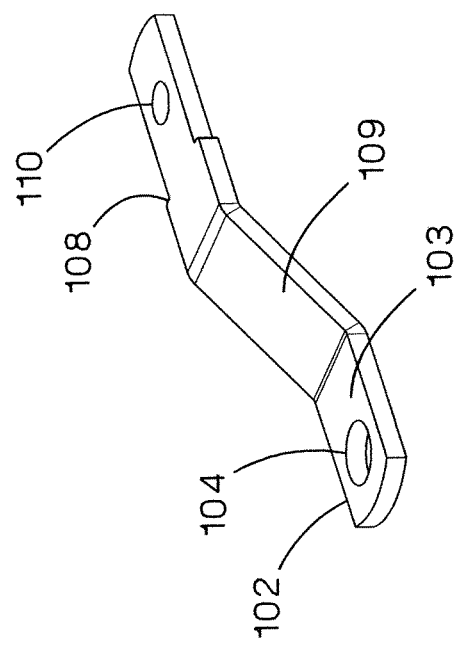
FIG. 10 is a perspective view of the steel body of FIG. 4 with multiple bends.

FIGS. 10 and 11 illustrate alternative designs for the steel body 102. As shown in FIG. 10, the steel body 102 may include multiple bends to avoid obstructions. As shown in FIG. 11, the steel body 102 has various bend points, which results in various bend angles for the two piece mount 100.

Figure 12:
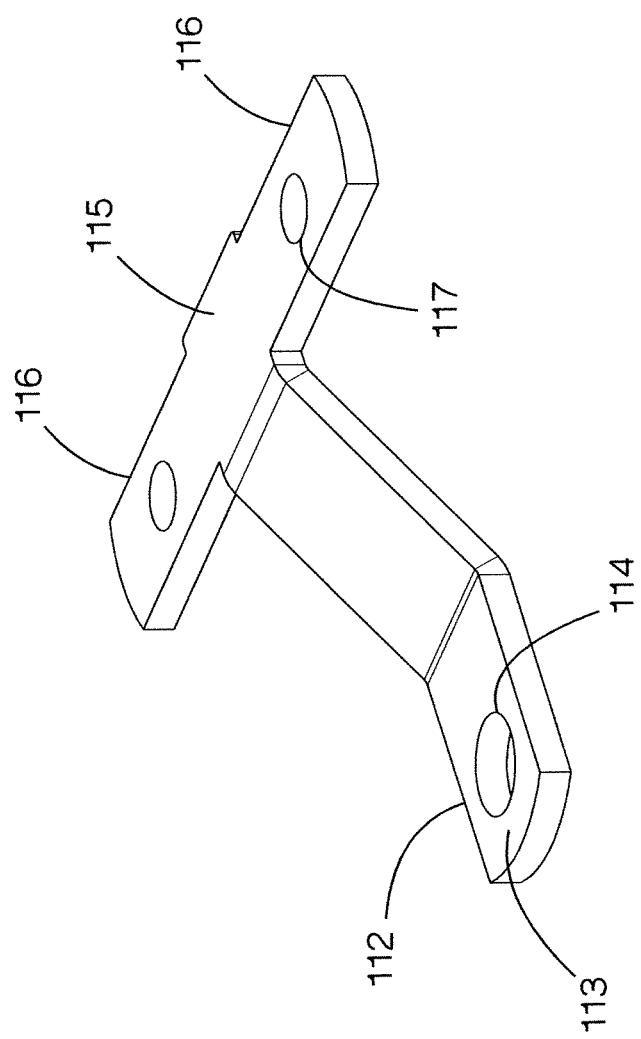
FIG. 12 is a perspective view of the steel body of FIG. 4 having multiple arms.
Figure 13:
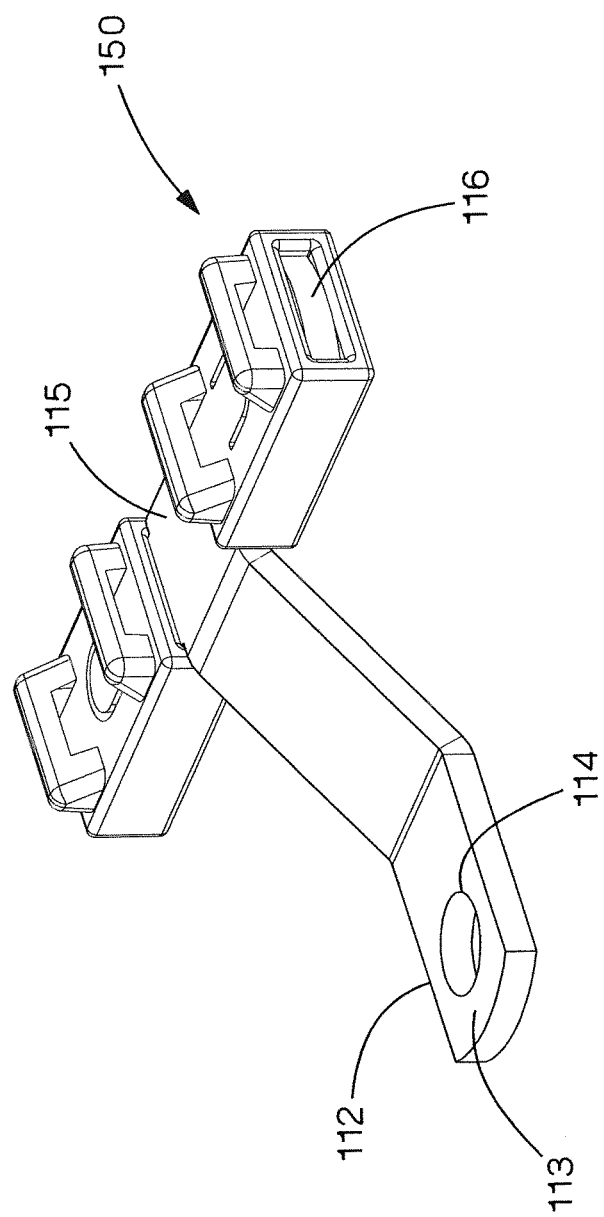
FIG. 13 is a perspective view of the steel body of FIG. 12 with a snap-on mount installed on each arm.
Figure 14:
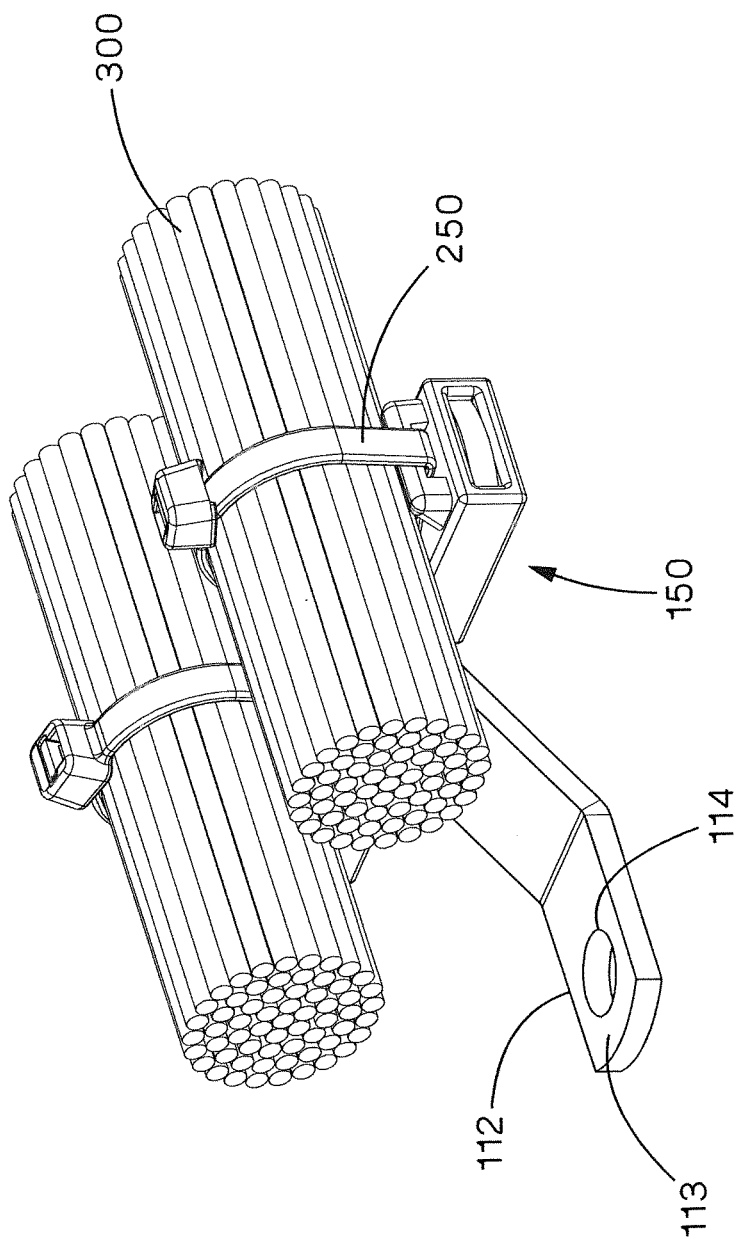
FIG. 14 is a perspective view of the of the snap-on mounts installed on the steel body of FIG. 13 with bundles and a cable tie installed in each snap-on mount to secure the bundles.

As set forth in FIGS. 12-14, the steel body 112 can be designed with a base member 113 having a mounting hole 114 and a receiving member 115 having arms 116. Each arm 116 includes a locking hole 117 for receiving a snap-on mount 150. Once the snap-on mounts 150 are installed, bundles 300 and cable ties 250 may be secured to the snap-on mount 150 (see FIG. 14).

Figure 15:
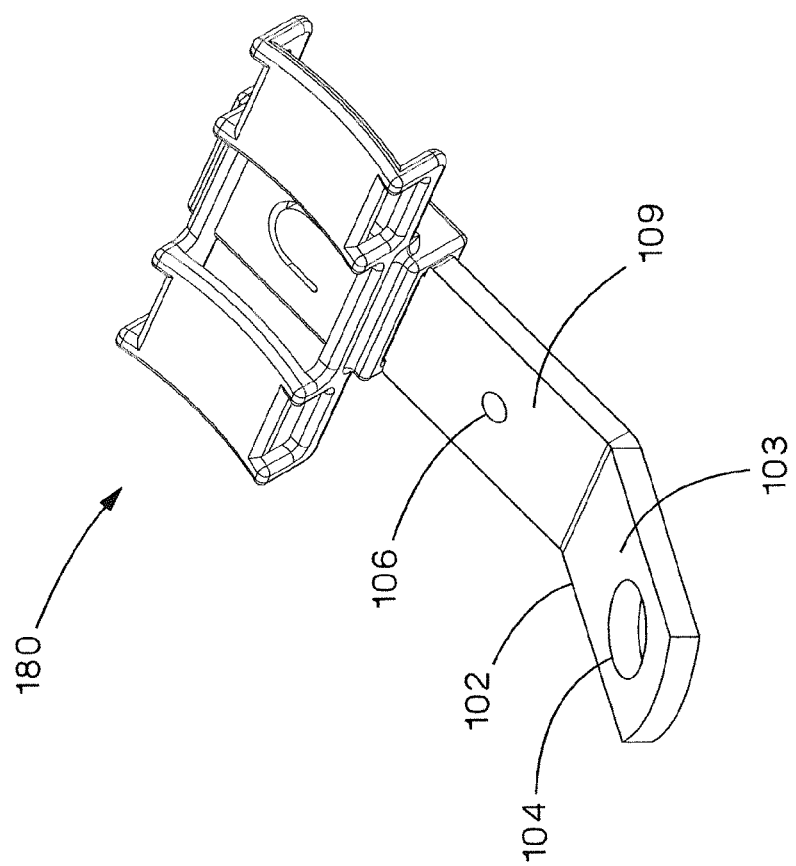
FIG. 15 is a perspective view of the steel body of FIG. 4 with an alternative snap-on mount installed thereon.
Figure 16:
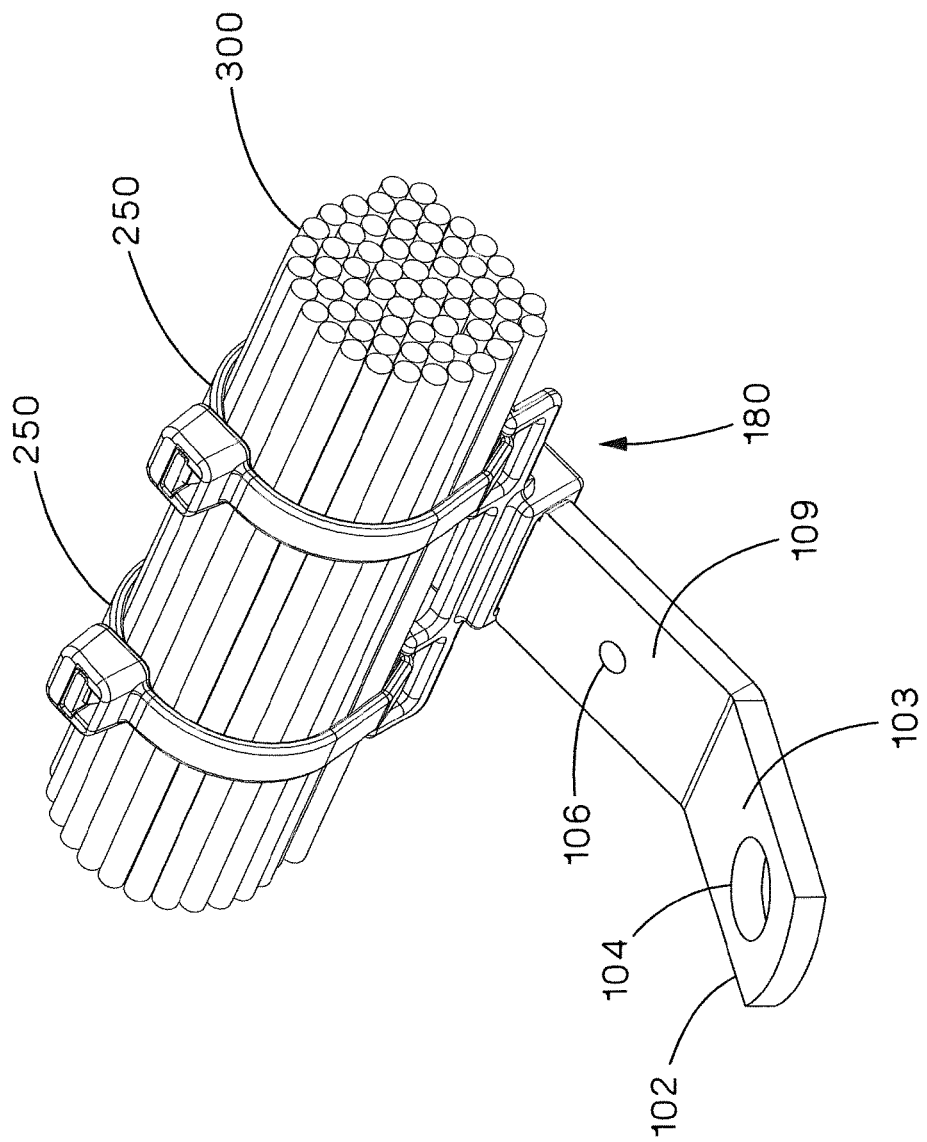
FIG. 16 is a perspective view of the alternative snap-on mount installed on the steel body of FIG. 15 with a bundle and cable ties installed in the snap-on mount to secure the bundle.
Figure 17:
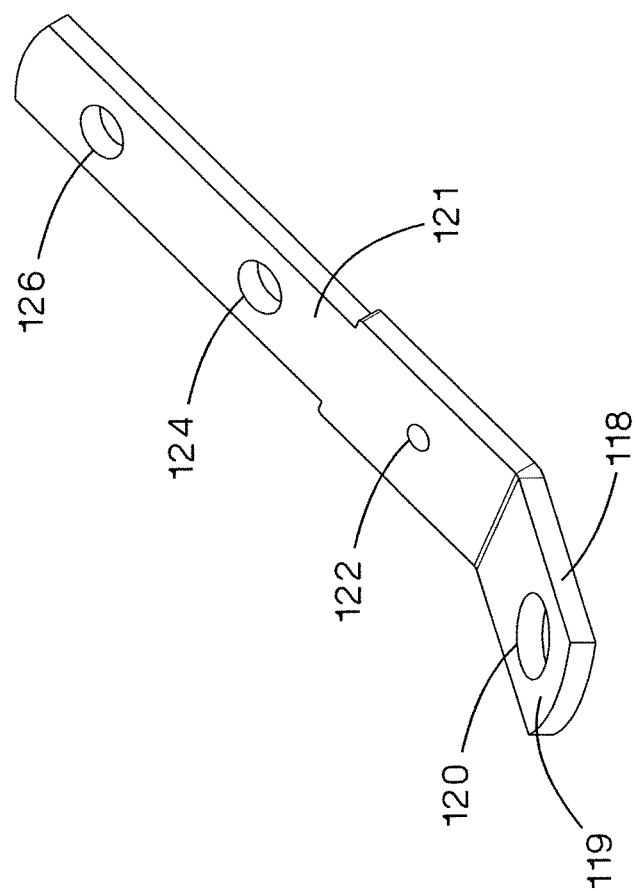
FIG. 17 is a perspective view of a steel body having multiple locking holes.

FIGS. 15 and 16 illustrate an alternative snap-on mount 180 designed to receive a bundle 300 secured by two cable ties 250.

Figure 18:
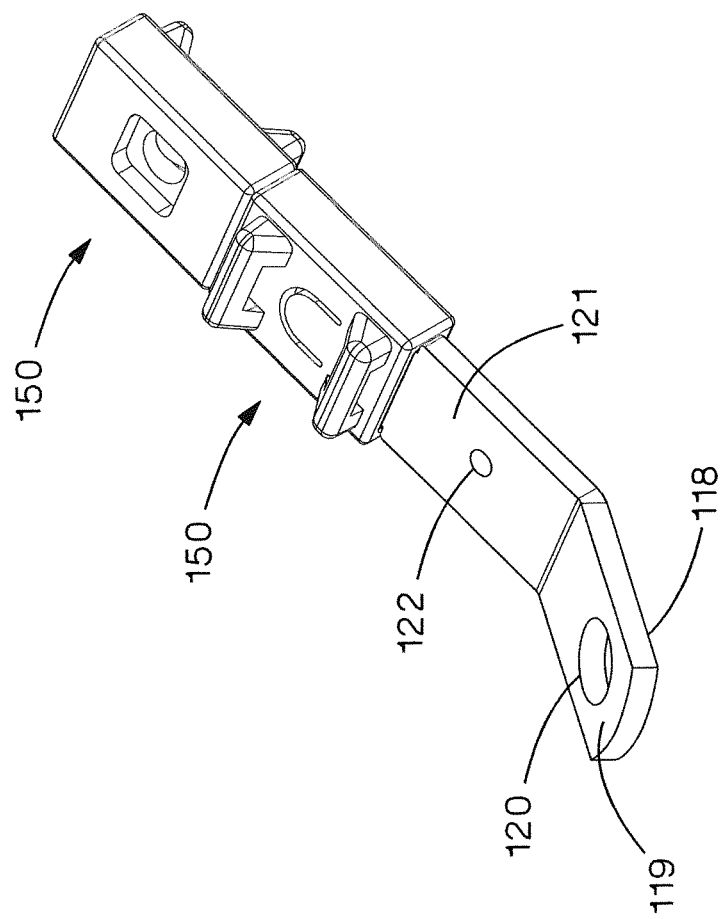
FIG. 18 is a perspective view of the steel body of FIG. 17 with multiple snap-on mounts.
Figure 19:
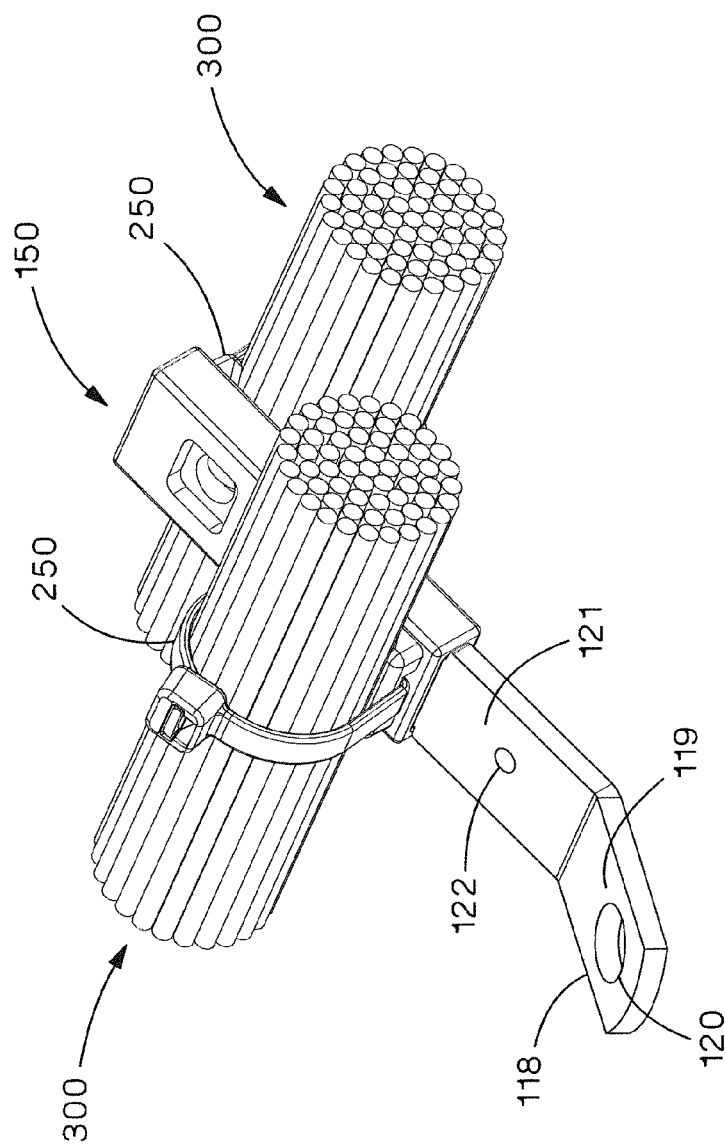
FIG. 19 is a perspective view of the multiple snap-on mounts installed on the steel body of FIG. 18 with bundles and a cable tie installed in each snap-on mount to secure the bundles.
Figure 20:
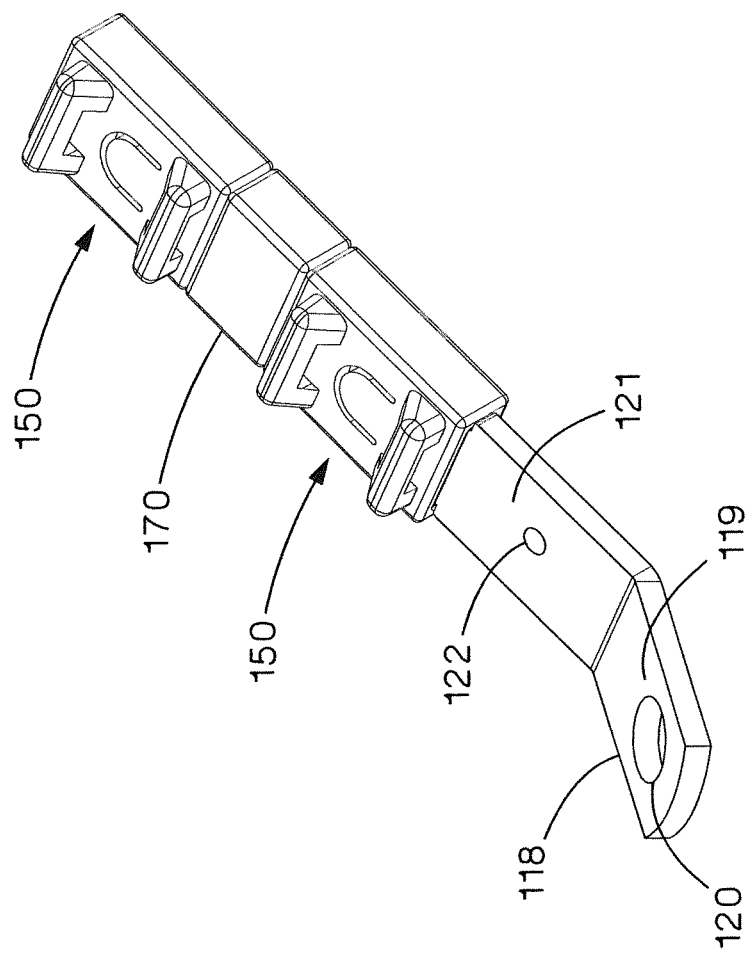
FIG. 20 is a perspective view of the steel body of FIG. 17 with multiple snap-on mounts and a spacer positioned therebetween.
Figure 21:
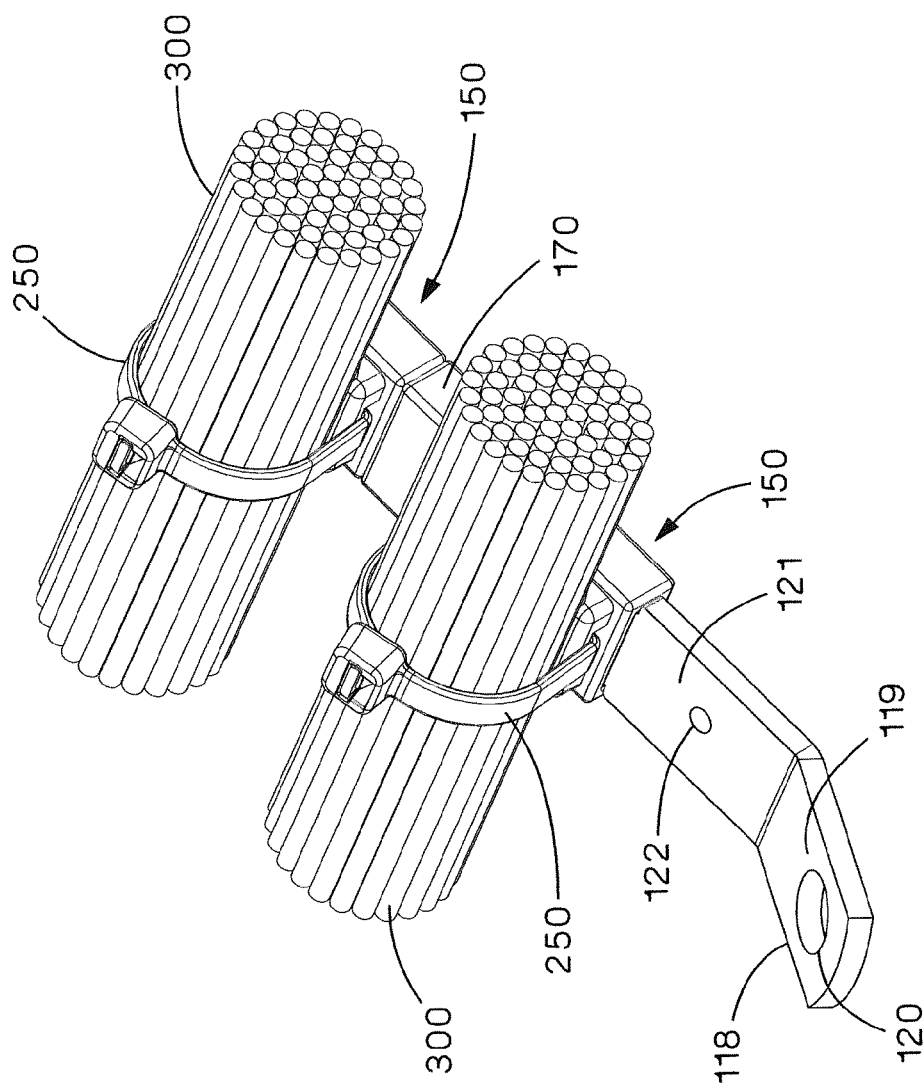
FIG. 21 is a perspective view of the multiple snap-on mounts with a spacer installed on the steel body of FIG. 20 with bundles and a cable tie installed in each snap-on mount to secure the bundles.

FIGS. 17-21 illustrate a steel body 118 having a base member 119 with a mounting hole 120 and a receiving member 121 with a grounding hole 122 and multiple locking holes 124, 126 to receive multiple snap-on mounts 150. One locking hole is required per snap-on mount. The spacing of the locking holes 124, 126 and the snap-on mounts 150 is dependent upon customer specifications. As illustrated in FIGS. 18 and 19, the snap-on mounts 150 may be positioned such that a bundle 300 is located on each side of the steel body 118. As illustrated in FIGS. 20-21, the snap-on mounts 150 may be positioned such that the bundles 300 are located on the top of the steel body 118. FIGS. 20-21 also illustrate a slip on spacer 170 that may be installed to space the bundles further apart, if desired.

Figure 22:
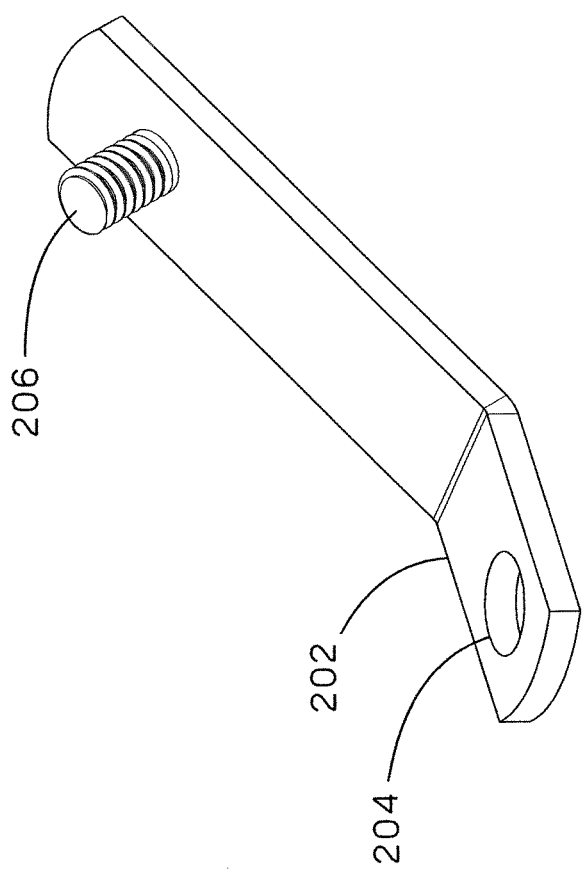
FIG. 22 is a perspective view of a standoff with a threaded stud.
Figure 23:
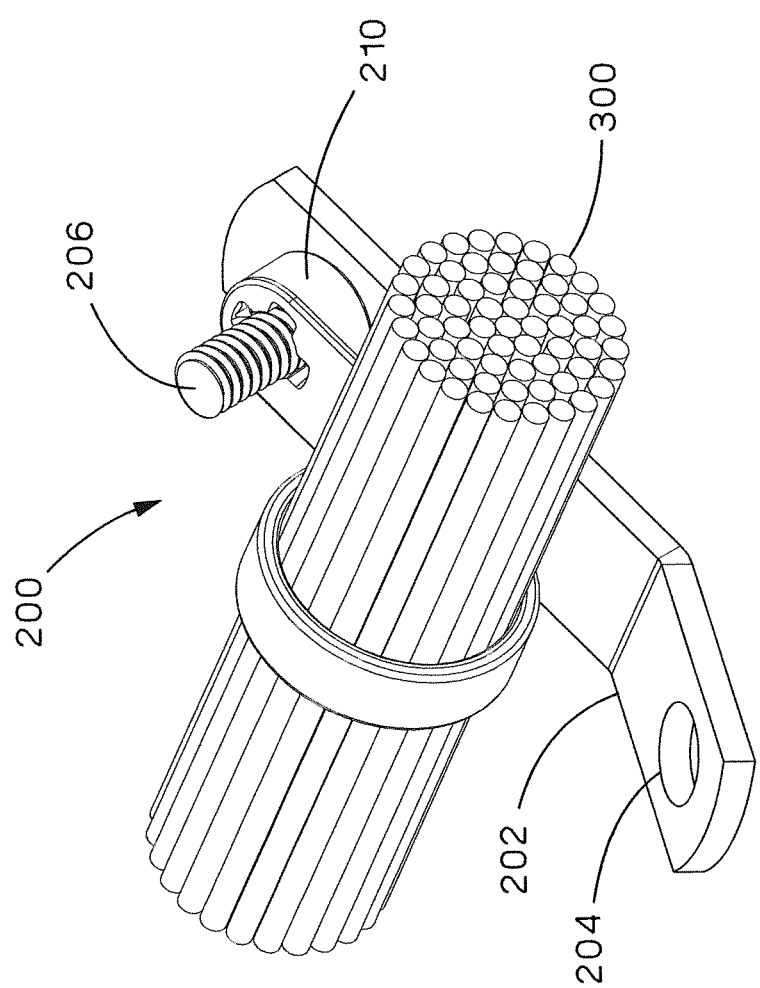
FIG. 23 is a perspective view of a bundle and a stud mount installed on the threaded stud of FIG. 22.

FIGS. 22-30 illustrate standoff assemblies 200, 200a with a steel standoff 202, 212 designed to be used with a variety of mount products, for example Panduit's screw or rivet mount products, push mount products, or stud mount products. The standoff assembly can be used for light, medium and heavy applications. As illustrated in FIG. 22, the standoff 202 includes a mounting hole 204 and a self-clinching threaded stud 206 for receiving stud mounted cable ties and wiring accessories. FIG. 23 illustrates the standoff 202 with a threaded stud 206 receiving a stud mount 210 to secure a bundle 300.

Figure 24:
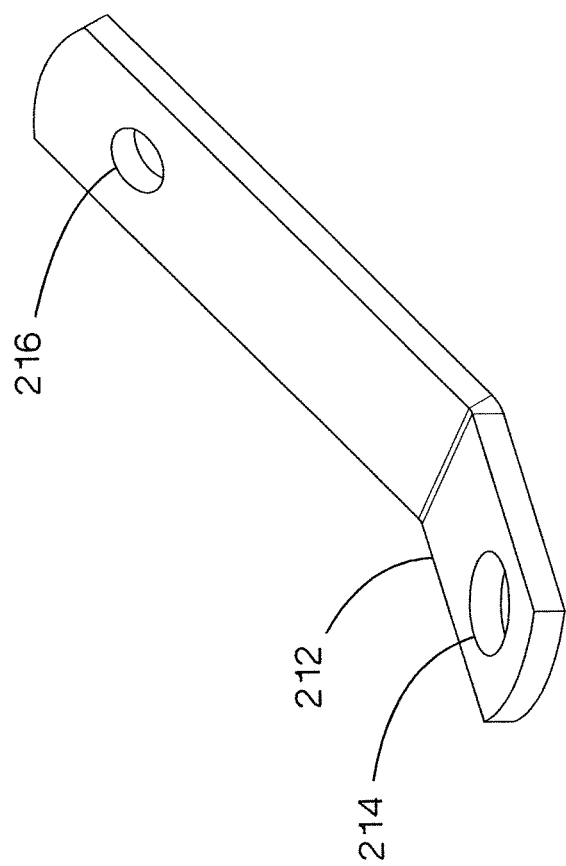
FIG. 24 is a perspective view of a standoff with a clearance hole.
Figure 25:
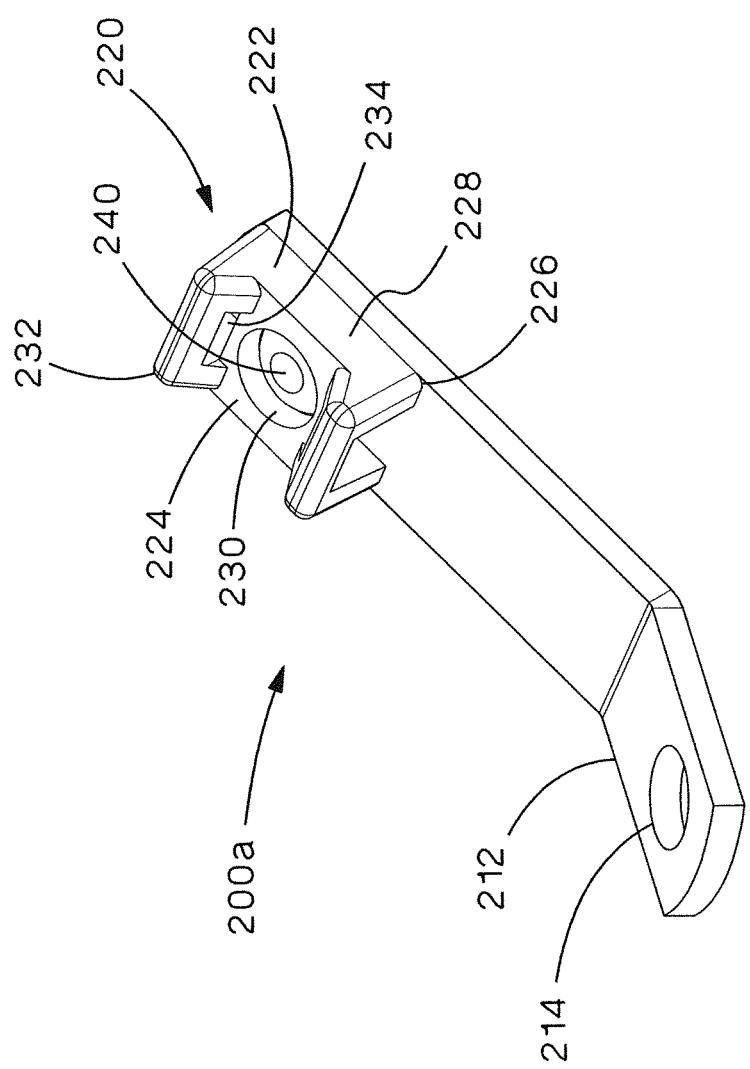
FIG. 25 is a perspective view of the standoff of FIG. 24 with a single mount installed thereon.
Figure 26:
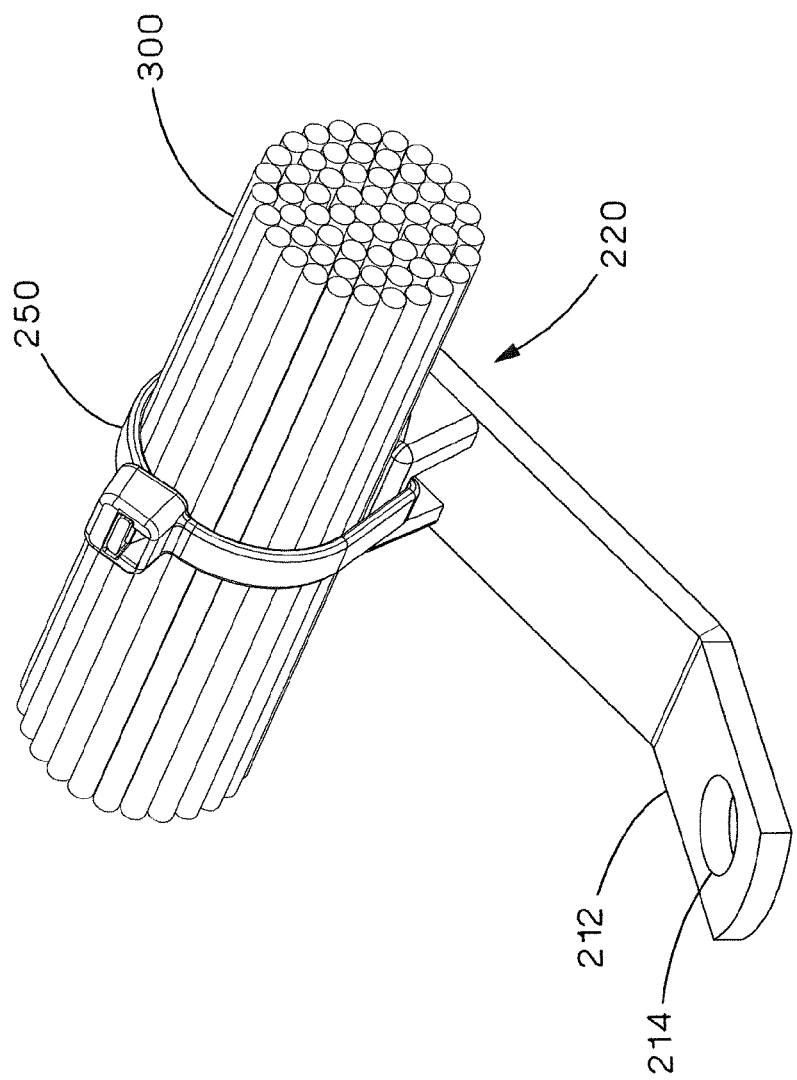
FIG. 26 is a perspective view of the mount installed on the standoff of FIG. 25 with a bundle and a cable tie installed in the mount to secure the bundle.

Alternatively, as illustrated in FIG. 24, the standoff 212 may include a mounting hole 214 and a clearance hole 216 for receiving mounts 220. FIGS. 25-30 illustrate standoff assemblies 200a with various heavy duty mount configurations including rivet mounts 220 installed on the standoff 212. FIGS. 25 and 26 illustrate a single pivoting mount 220 secured to the standoff 212. The mount 220 includes a base 222 with a top 224, bottom 226 and sides 228. The mount 220 includes a hole 230 in the center for receiving a rivet 240 to secure the mount 220 to the standoff 212. Projections 232 extend from the top of the base 222 creating a passageway 234 for cable ties 250. A bundle 300 is positioned on the mount 220 and a cable tie 250 secures the bundle 300 to the mount 220. The riveted mount assembly provides added strength for heavy duty applications and swivel capability for maximum bundle orientation.

Figure 27:
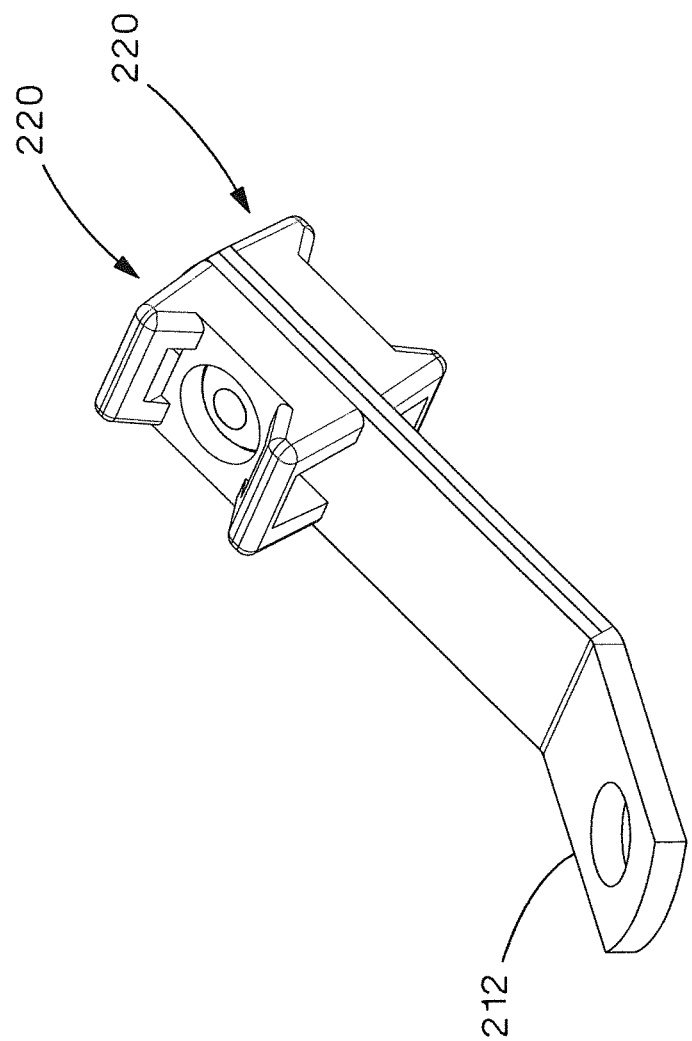
FIG. 27 is a perspective view of the standoff of FIG. 24 with dual mounts installed on a single rivet.
Figure 28:
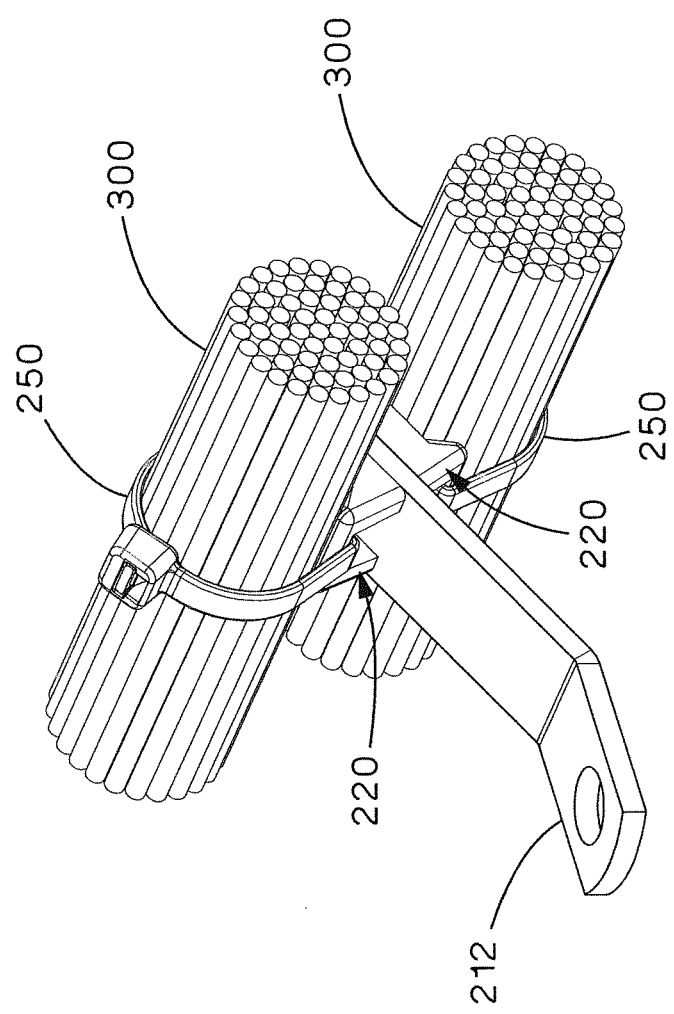
FIG. 28 is a perspective view of the mounts installed on the standoff of FIG. 27 with bundles and a cable tie installed in each mount to secure the bundles.

FIGS. 27 and 28 illustrate dual pivoting mounts 220 with one mount 220 positioned on each side of the standoff 212. A bundle 300 is positioned on each mount 220 and cable ties 250 secure the bundles 300 to the mounts 220. As illustrated in FIG. 28, the bundles 300 are positioned on the top and on the bottom of the standoff 212 and are parallel to each other.

Figure 29:
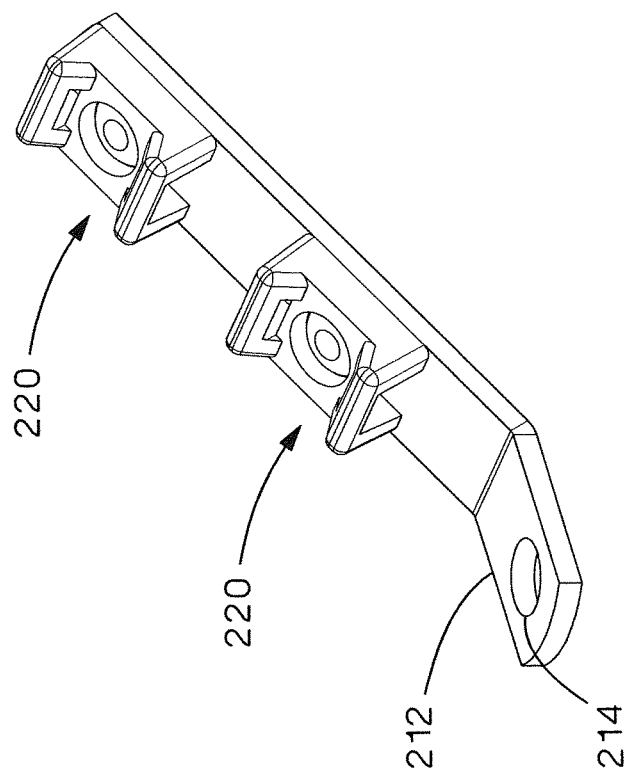
FIG. 29 is a perspective view of the standoff of FIG. 24 with multiple mounts installed thereon.
Figure 30:
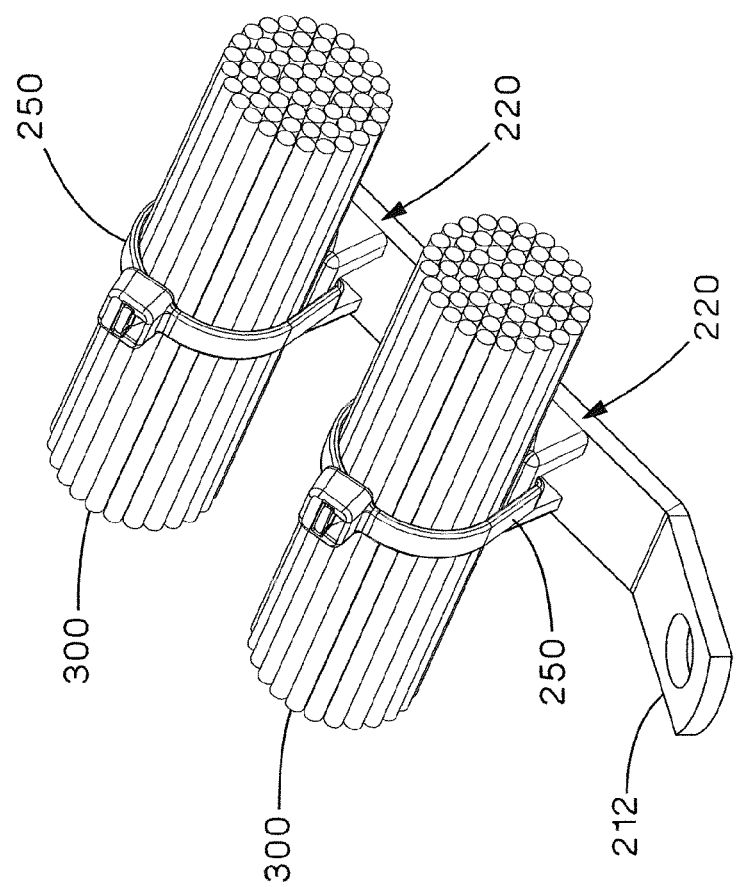
FIG. 30 is a perspective view of the mounts installed on the standoff of FIG. 29 with bundles and a cable tie installed in each mount to secure the bundles.

FIGS. 29 and 30 illustrate multiple mounts 220 positioned on the standoff 212. The position of the mounts 220 depends on customer specifications. A bundle 300 is positioned on each mount 220 and cable ties 250 secure the bundles 300 to the mounts 220. As illustrated in FIG. 30, the bundles 300 are positioned on top of the standoff 212 and are parallel to each other.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation.

The invention claimed is:

1. A cable tie mount comprising:
   a body having a base member and a receiving member, wherein the receiving member extends at an angle from the base member;
   at least one mount secured to the receiving member of the body, wherein the at least one mount having a top, a bottom, sides, a first end, a second end, and a channel extending therethrough from the first end to the second end, whereby the receiving member is positioned within the channel of the at least one mount; and
   wherein the at least one mount having projections extending from the top of the mount and positioned above the mount defining a passageway between the top of the mount and the projections for receiving a cable tie.

2. The cable tie mount of claim 1, wherein the top of the at least one mount includes a locking pawl, the locking pawl engages the receiving member of the body to prevent the at least one mount from being removed.

3. The cable tie mount of claim 1, wherein the at least one mount snaps on to the receiving member.

4. The cable tie mount of claim 1, wherein the base member having a mounting hole.

5. The cable tie mount of claim 1, wherein the receiving member having a locking hole for securing the at least one mount to the body.

6. The cable tie mount of claim 1, wherein the receiving member having a grounding hole for attaching a grounding cable.

7. The cable tie mount of claim 1, wherein the receiving member having mount stops for limiting the insertion distance of the at least one mount on the body.

8. The cable tie mount of claim 1, wherein the receiving member of the body includes an angled portion and a horizontal portion, the horizontal portion is parallel to the base member.

9. The cable tie mount of claim 1, wherein the receiving member of the body includes an angled portion and a horizontal portion, the horizontal portion is perpendicular to the base member.

10. The cable tie mount of claim 1, wherein the receiving member of the body includes arms extending in opposite directions.

11. The cable tie mount of claim 10, wherein each arm having a locking hole for securing a mount to the body.

12. The cable tie mount of claim 1, wherein the receiving member of the body further comprising a plurality of locking holes for receiving a plurality of mounts.

13. The cable tie mount of claim 12, wherein the at least one mount comprising a first mount and a second mount, wherein the first mount and the second mount are positioned on the receiving member for securing at least one bundle.

14. The cable tie mount of claim 13, wherein the top of the first mount and the top of the second mount extend in opposite directions.

15. The cable tie mount of claim 13, wherein the top of the first mount and the top of the second mount extend in the same direction.

16. The cable tie mount of claim 13, further comprising a spacer positioned on the receiving member of the body between the first mount and the second mount.

17. The cable tie mount of claim 1, wherein the body is a steel body.

* * * * *